Patented Aug. 5, 1952

2,606,167

UNITED STATES PATENT OFFICE 2,606,167

POLYVINYL ALDEHYDE AND POLYVINYL ACETATE RESIN PLASTICIZED WITH 1,5-PENTANEDIOL DIFUROATE

Stanford J. Hetzel, Cheltenham, Pa., assignor to Sun Oil Company, Philadelphia, Pa., a corporation of New Jersey No Drawing. Application December 30, 1949, Serial No. 136,143

5 Claims. (Cl. 260—30.4)

This invention relates to plasticized polyvinyl aldehyde and polyvinyl acetate resin compositions, and to the use of 1,5-pentanediol difuroate as plasticizer in such compositions.

1,5-pentanediol difuroate is disclosed and claimed in applicant's copending application Serial No. 46,183, filed August 25, 1948, now U. S. Patent 2,578,246, issued December 11, 1951. The product therein described is a colorless to pale amber oil-like material having a boiling point at 4 mm. Hg of about 240° C.–260° C., a refractive index $$N\frac{20°\ C.}{D}$$

of 1.5118, a density $$D\frac{20°\ C.}{4}$$

of 1.189, and a melting point of about 12° C.–15° C. Polyvinyl chloride resins plasticized with 1,5-pentanediol difuroate are disclosed and claimed in applicant's copending application Serial No. 46,188, filed August 25, 1948, now U. S. Patent 2,504,930, issued April 18, 1950.

According to the present invention, 1,5-pentanediol difuroate is compounded with a resin selected from the group consisting of polyvinyl formal, polyvinyl acetal, polyvinyl butyral, and polyvinyl acetate resins to form a composition comprising the resin plasticized with 1,5-pentanediol difuroate.

The following examples illustrate the invention:

Example I 80 parts by weight of a resin, known commercially as Vinylite AYAF and consisting essentially of polyvinyl acetate, were fused on a 3" x 8" rubber mill, whose rolls were heated to 220–230° F. About 20 parts of 1,5-pentanediol difuroate as plasticizer and about 1 part of magnesium stearate as lubricant were added to the fused resin. The resin and ester blended to form a homogeneous mixture. The mixture was sheeted off at 175–190° F. to give a plastic sheet having satisfactory tensile strength, odor and appearance, and flexibility substantially increased over that of the unplasticized resin.

Example II 80 parts by weight of a polyvinyl formal resin known commercially as Formvar 15/95 S were mixed together with about 20 parts by weight of 1,5-pentanediol difuroate and about 1 part of magnesium stearate. The mixture was then fused on a 3" x 8" rubber mill whose rolls were heated to about 300° F. The resin and ester blended to form a homogeneous mixture. The mixture sheeted off to give a satisfactory plastic sheet.

Example III 40 parts by weight of a polyvinyl butyral resin known commercially as Vinylite XYSG were mixed together with about 60 parts by weight of 1,5-pentanediol difuroate and about 1 part of magnesium stearate. The mixture was then fused on a 3" x 8" rubber mill whose rolls were heated to about 250° F. The resin and ester blended to form a homogeneous mixture. The mixture sheeted off to give a plastic sheet having increased flexibility and satisfactory tensile strength, odor, and appearance.

The above examples show that 1,5-pentanediol difuroate, in proportion sufficient to plasticize the resin, is compatible with polyvinyl acetate and polyvinyl aldehyde resin. The ester and resin may be compounded according to methods as practiced in the arts relating to the respective resins.

Polyvinyl formal, polyvinyl acetal, and polyvinyl butyral resins, where referred to in the present specification, are intended to indicate resinous materials obtained by reacting hydrolyzed polyvinyl acetate resin with formaldehyde, acetaldehyde, and butyraldehyde respectively in the manner well known in the art for preparation of such polyvinyl aldehyde resins, the ratio of the acetal portion of such resinous materials to the unconverted acetyl and hydroxyl portions thereof being of substantial magnitude and generally at least about one.

I claim:

1. A composition comprising a resin selected from the group consisting of polyvinyl formal, polyvinyl acetal, polyvinyl butyral, and polyvinyl acetate resins, said resin plasticized with 1,5-pentanediol difuroate.

2. Composition according to claim 1 wherein said resin is a polyvinyl formal resin.

3. Composition according to claim 1 wherein said resin is a polyvinyl butyral resin.

4. Composition according to claim 1 wherein said resin is a polyvinyl acetate resin.

5. Composition according to claim 1 wherein said resin is a polyvinyl acetal resin.

STANFORD J. HETZEL.

REFERENCES CITED

The following references are of record in the file of this patent:

UNITED STATES PATENTS

| Number | Name | Date |
|---|---|---|
| 2,339,387 | Endres | Jan. 18, 1944 |
| 2,504,930 | Hetzel | Apr. 18, 1950 |